(12) United States Patent
Spanel et al.

(10) Patent No.: US 9,451,446 B2
(45) Date of Patent: Sep. 20, 2016

(54) SIM PROFILE BROKERING SYSTEM

(71) Applicant: Sprint Communications Company L.P., Overland Park, KS (US)

(72) Inventors: Robert L. Spanel, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 278 days.

(21) Appl. No.: 13/744,861

(22) Filed: Jan. 18, 2013

(65) Prior Publication Data

US 2014/0206313 A1 Jul. 24, 2014

(51) Int. Cl.
*H04W 8/20* (2009.01)

(52) U.S. Cl.
CPC .................................. *H04W 8/20* (2013.01)

(58) Field of Classification Search
USPC .................................. 455/410, 411, 418, 466
See application file for complete search history.

(56) References Cited

U.S. PATENT DOCUMENTS

| | | | |
|---|---|---|---|
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,571,536 B2 | 10/2013 | Urbanek | |
| 8,612,967 B1 | 12/2013 | Delker | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 2002/0091931 A1 | 7/2002 | Quick, Jr. et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2005/0197098 A1 | 9/2005 | Trossen | |
| 2006/0135144 A1 | 6/2006 | Jothipragasam | |
| 2006/0154651 A1 | 7/2006 | Knowles | |

(Continued)

FOREIGN PATENT DOCUMENTS

WO WO2012078753 A1 6/2012
WO WO2013169983 A1 11/2013

(Continued)

OTHER PUBLICATIONS

Spanel, Robert L., et al., International Application entitled "SIM Profile Brokering System" International Application No. PCT/US2013/068981 filed on Nov. 7, 2013.

(Continued)

*Primary Examiner* — Sam Bhattacharya

(57) ABSTRACT

A method for receiving identity information for a mobile communication device is provided. The method comprises a memory module on the mobile communication device receiving, over a wireless communication link, a device identifier and an authentication key, wherein no identity information had previously been provided to the memory module. The memory module may be one of a subscriber identity module (SIM), a universal integrated circuit card (UICC), a universal subscriber identity module (USIM), or a removable identity module (R-UIM).

20 Claims, 6 Drawing Sheets

(56) References Cited

U.S. PATENT DOCUMENTS

| | | |
|---|---|---|
| 2006/0203722 A1 | 9/2006 | Oommen |
| 2006/0208071 A1 | 9/2006 | Chang et al. |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046997 A1 | 2/2008 | Wang |
| 2008/0062900 A1 | 3/2008 | Rao |
| 2008/0065753 A1 | 3/2008 | Rao |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0106200 A1 | 4/2009 | Salinas et al. |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1 | 9/2010 | Vanderlinden et al. |
| 2010/0262638 A1 | 10/2010 | Fitzgerald |
| 2010/0311404 A1 | 12/2010 | Shi et al. |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0030062 A1 | 2/2011 | Hsu et al. |
| 2011/0035421 A1 | 2/2011 | Laird-Mcconnell et al. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0306318 A1 | 12/2011 | Rodgers et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0203824 A1 | 8/2012 | Oommen |
| 2012/0208511 A1 | 8/2012 | Vanderlinden et al. |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2013/0023235 A1 | 1/2013 | Fan et al. |
| 2013/0031191 A1 | 1/2013 | Bott |
| 2013/0046951 A1 | 2/2013 | Jones |
| 2013/0065578 A1 | 3/2013 | Raleigh et al. |
| 2013/0085914 A1 | 4/2013 | McPherson et al. |
| 2013/0111461 A1 | 5/2013 | Zubas et al. |
| 2013/0303142 A1 | 11/2013 | Burcham et al. |
| 2014/0080467 A1 | 3/2014 | Urbanek |
| 2014/0113610 A1 | 4/2014 | Ramprasad et al. |
| 2014/0228012 A1 | 8/2014 | Annan et al. |
| 2014/0228042 A1 | 8/2014 | Annan et al. |
| 2014/0274032 A1 | 9/2014 | Shipley et al. |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |

OTHER PUBLICATIONS

Foreign Communication From a Related Counterpart Application, International Search Report and Written Opinion dated Jan. 24, 2014, International Application No. PCT/US13/68981 filed on Nov. 7, 2013.

Notice of Allowance dated Apr. 26, 2012, U.S. Appl. No. 12/962,620, filed Dec. 7, 2010.

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Notice of Allowance dated Aug. 9, 2013, U.S. Appl. No. 13/149,505, filed May 31, 2013.

First Action Interview Pre-Interview Communication dated Aug. 13, 2013, U.S. Appl. No. 13/335,941, filed Dec. 23, 2011.

Notice of Allowance dated Oct. 9, 2013, U.S. Appl. No. 13/335,941, filed Dec. 23, 2011.

First Action Interview Pre-Interview Communication dated Apr. 23, 2014, U.S. Appl. No. 13/622,234, filed Sep. 18, 2012.

Final Office Action dated Sep. 19, 2014, U.S. Appl. No. 13/622,234, filed Sep. 18, 2012.

Notice of Allowance dated Aug. 4, 2014, U.S. Appl. No. 13/744,847, filed Jan. 18, 2013.

First Action Interview Pre-Interview Communication dated Apr. 3, 2014, U.S. Appl. No. 13/763,434, filed Feb. 8, 2013.

Final Office Action dated Aug. 19, 2014, U.S. Appl. No. 13/763,434, filed Feb. 8, 2013.

Office Action dated Aug. 7, 2014, U.S. Appl. No. 13/831,504, filed Mar. 14, 2013.

Foreign Communication from a Related Counterpart—International Search Report and Written Opinion, dated Feb. 29, 2012, PCT/US2011/063736, filed on Dec. 7, 2011.

Foreign Communication from a Related Counterpart Application, "Preliminary Report on Patentability", dated Jun. 20, 2013, PCT/US2011/063736 filed on Dec. 7, 2011.

Foreign Communication from a Related Counterpart—International Search Report and Written Opinion, dated Jul. 24, 2013, PCT/US13/40278, filed on May 9, 2013.

Foreign Communication from a Related Counterpart—International Search Report and Written Opinion, dated Nov. 14, 2013, PCT/US13/55023, filed on Aug. 15, 2013.

Foreign Communication from a Related Counterpart—International Search Report and Written Opinion, dated May 19, 2014, PCT/US14/13936, filed on Jan. 30, 2014.

Foreign Communication from a Related Counterpart—International Search Report and Written Opinion, dated May 14, 2014, PCT/US14/13939, filed on Jan. 30, 2014.

Delker, Jason R., "Loading Branded Media Outside System Partition", filed Oct. 30, 2013 U.S. Appl. No. 14/066,947.

Mauer, Brian D., et al., "Automatic Branding of Generic Applications", filed Jan. 10, 2013, U.S. Appl. No. 14/152,627.

(56) References Cited

OTHER PUBLICATIONS

Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014, PCT/US14/16650, filed on Feb. 16, 2014.
Spanel, Robert L., et al., Patent Application entitled "Dynamic Remotely Managed SIM Profile" U.S. Appl. No. 13/744,847, filed Jan. 18, 2013.
FAIPP Pre-Interview Communication dated Mar. 19, 2014, U.S. Appl. No. 13/744,847, filed on Jan. 18, 2013.
Advisory Action dated Dec. 17, 2014, U.S. Appl. No. 13/622,234, filed Sep. 18, 2012.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, Preliminary Report on Patentability, dated Nov. 20, 2014, PCT/US13/40278 filed on May 9, 2013 [15901].
Foreign Communication from a Related Counterpart—International Search Report and Written Opinion, dated Dec. 17, 2014, PCT/US14/46773, filed on Jul. 16, 2014 [36501].
Foreign Communication from a Related Counterpart—International Search Report and Written Opinion, dated Dec. 30, 2014, PCT/US14/56778, filed Sep. 22, 2014, [35501].
Spanel, Robert L., et al., Patent Application entitled "Dynamic Remotely Managed Sim Profile" U.S. Appl. No. 14/522,586, filed Oct. 24, 2014.
Koller, Gary D., et al., "Out of the Box Experience (OOBE) Country Choice Using Wi-Fi Layer Transmission," filed Oct. 31, 2014, U.S. Appl. No. 14/530,666.

us 9,451,446 B2

SIM PROFILE BROKERING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones, personal digital assistants, and similar portable electronic devices that have telecommunications capabilities may include at least one memory module, such as but not limited to a Universal Integrated Circuit Card (UICC), a Subscriber Identity Module (SIM), a Universal Subscriber Identity Module (USIM), or a Removable User Identity Module (R-UIM). Any such module may be referred to herein as a memory module. Identifying information associated with the mobile device, identifying information associated with the user of the mobile device, user account information, and other device-related and/or user-related information may be stored in the memory module. Some memory modules may be removable cards, and other memory modules may be embedded in the circuitry of the mobile device.

Mobile devices that communicate according to the global system for mobile communications (GSM) wireless communication protocol or according to the long-term evolution (LTE) wireless communication protocol typically use SIM cards. Devices that communicate according to the code division multiple access (CDMA) wireless communication protocol or according to the worldwide interoperability for microwave access (WiMAX) wireless communication protocol typically do not use SIM cards.

SUMMARY

In an embodiment, a method for receiving identity information for a mobile communication device is disclosed. The method comprises a memory module on the mobile communication device receiving, over a wireless communication link, a device identifier and an authentication key, wherein no identity information had previously been provided to the memory module. The memory module may be one of a subscriber identity module (SIM), a universal integrated circuit card (UICC), a universal subscriber identity module (USIM), or a removable identity module (R-UIM).

In another embodiment, a method for providing identity information for a mobile communication device is disclosed. The method comprises an identity server storing concurrently a plurality of instances of the identity information, and the identity server providing at least one of the instances of the identity information to at least one memory module on the mobile communication device, wherein the number of concurrently stored instances of the identity information is greater than the number of memory modules. The at least one memory module may be one of a subscriber identity module (SIM), a universal integrated circuit card (UICC), a universal subscriber identity module (USIM), or a removable identity module (R-UIM).

In another embodiment, a mobile communication device is provided. The mobile communication device comprises a cellular radio transceiver, a processor, a non-transitory memory, and an application stored in the non-transitory memory. When executed by the processor, the application is configured to use the cellular radio transceiver to establish a secure wireless communication link between the mobile communication device and an identity server. The application is further configured to retrieve identity information from the identity server over the wireless communication link. The application is further configured to install the identity information on a memory module on the mobile communication device. The memory module may be one of a subscriber identity module (SIM), a universal integrated circuit card (UICC), a universal subscriber identity module (USIM), or a removable identity module (R-UIM).

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
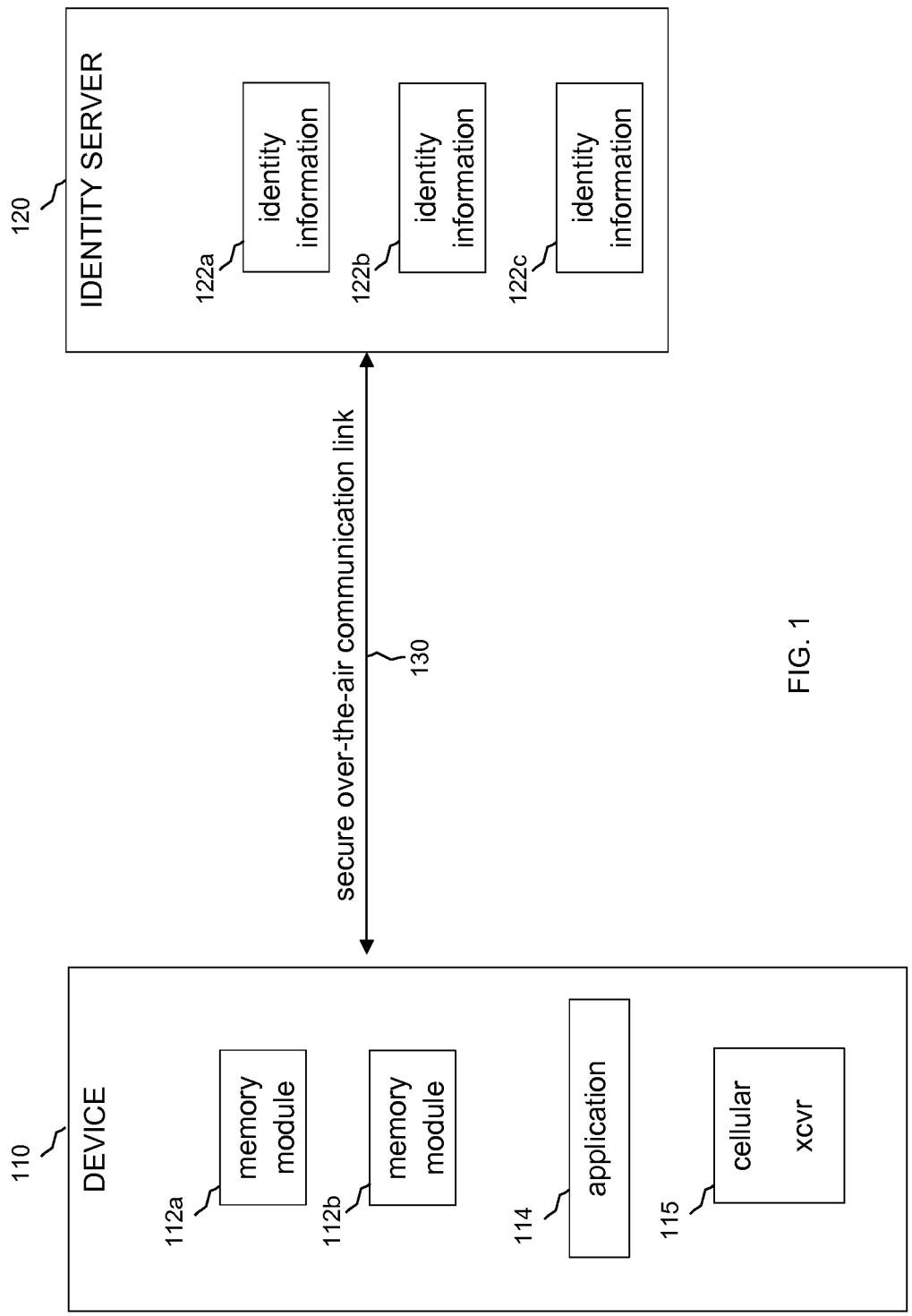
FIG. 1 is an illustration of a system for providing and receiving identity information according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure describes a system for and methods of providing identity information to a memory module. In an embodiment, identity information for a memory module is provided to the memory module remotely after the time of manufacture of the memory module. That is, identity information may not be installed on the memory module by the memory module manufacturer, but instead may be delivered over the air. Alternatively or additionally, the memory module may have identity information pre-programmed in the standard manner, but the pre-programmed identity information may be replaced with new identity information over the air. That is, the embodiments disclosed herein may be applicable both to providing initial identity information to a memory module and to overwriting existing identity information for a memory module. An identity management server may hold multiple potential identities for a single memory module, and the server may send one or more of the identities to the memory module based on a request or in other circumstances. Which identity information applies to a primary profile and which to a secondary profile may also be specified. The form factor of the memory module is irrelevant. That is, the embodiments may apply to either embedded modules or to removable modules. The provision of identity information after shipment may allow memory module manufacturers to produce generic memory modules that can be used by different telecommunications carriers.

Profile information for a memory module has typically been stored in the memory module at the time of manufacture of the memory module. The profile typically contains, among other information, a device identifier and an authentication key. In the case of LTE or GSM, the device identifier might be an International Mobile Subscriber Identity (IMSI), and the authentication key might be referred to as the K value. In the case of CDMA, the device identifier might be a Mobile Directory Number (MDN), and the authentication key might be referred to as the A key. Such information may be referred to herein as identity information.

Typically, only the manufacturer of the memory module has access to the critical profile parameters that are stored on the memory module, such as the identifier and the authentication key. Once this identity information has been stored in the memory module, it can typically be changed only by the manufacturer. That is, if the identifier or the authentication key is to be changed, the device may have to be returned to the manufacturer where it may be connected via a hard-wired connection to the appropriate equipment for making such a modification.

Data elements in the memory module have traditionally been protected by an access control list that may indicate which data elements can be modified over the air and which can be changed only via a cable at the factory. If an over-the-air update is attempted for a data element that cannot be modified over the air, the attempted update will not be performed.

Some devices may include both a primary profile and a secondary profile. Each profile may be associated with a different telecommunications provider, or the different profiles may exist for some other reason. The profiles might be prioritized such that the primary profile is used under typical circumstances and the secondary profile is used under less common circumstances. In some cases, the primary profile and the secondary profile are located in the same memory module, and in other cases, the primary profile and the secondary profile are located in different memory modules. At least one of the profiles might be loaded onto a removable memory module. If a device user wishes to change profiles, the user might replace a removable memory module that contains a first profile with another removable memory module that contains a second profile.

Currently, at or near the time of manufacture of a memory module, at least one pre-assigned identity configuration is loaded onto the memory module. When a device containing the memory module is activated, a device discovery application on the device determines the characteristics of the device that the memory module has been inserted into, such as the device's type, model, brand, or other device-related parameters.

In an embodiment, a memory module does not receive a pre-assigned identity at the time of manufacture of the memory module. When such a memory module is present in a device, an application on the device retrieves identity information at the time of fulfillment or at the time of activation of the device. As is understood by one of ordinary skill in the art, the term 'fulfillment' in this context refers at least in part to filling an order or satisfying an order for a mobile communication device, for example a mobile phone or other device, and may involve placing the device in a shipping box, affixing a mailing label to the box, possibly setting one or more configurable values associated with the mobile communication device, and possibly performing at least partial provisioning of service for the mobile communication device. That is, identity information may be provided to the memory module at or near the time when the device is first provisioned for wireless communication in a wireless communication service provider's network. The application may retrieve the identity information by first establishing a communication link with an identity server that has been populated with one or more identities. The application may then retrieve the appropriate identity information from the identity server and install the identity information in a memory module on the device.

In an embodiment, the application may determine which carrier's server to retrieve the identity information from in at least two different ways. In one scenario, the application may communicate with a central routing point, a broker, or a similar entity that directs the application to a server associated with the appropriate carrier for the memory module. Any such entity may be referred to herein as a routing component. In another scenario, an association may have previously been established between certain memory modules and certain carriers' servers. The application may be aware of such associations and use such an association to automatically connect to the server appropriate for the memory module in the device in which the application is present.

In an additional or alternative embodiment, one or more identities may have previously been loaded onto a memory module at the time of manufacture in the standard manner. One or more of the previously loaded identities may then be replaced remotely over the air by a replacement identity in the manner described above for an original identity. Such a replacement of identity information might be done, for example, to switch carriers or because fraud may have occurred with an existing identity.

As an example, a device might have a primary profile on a first memory module and a secondary profile on a second memory module. The user of the device might use the primary profile for calls within the user's home country and use the secondary profile when traveling to multiple foreign countries. Each foreign country may have a different service provider and therefore may require a different profile. Upon leaving one country and entering another, the user may request a new identity for the secondary profile over the air so that the device maintains a secondary profile appropriate for the country in which it is present. The primary profile would be retained throughout the swapping of the secondary profiles and would still be available to the user for domestic calls upon returning from the international travel. Such an over-the-air identity replacement may eliminate the need for the user to manually swap memory modules containing different profiles each time a different country is visited.

In an embodiment, the identity retrieval application on the device may determine if the memory module has an identity. If the memory module does not have an identity, the application may retrieve one. If the memory module does have an identity, the application may mediate the replacement of the existing identity with a different identity in one or more of several different ways. In an embodiment, the identity server may send a message to the application informing the application that a new identity is available for the application to retrieve. Alternatively, the application might periodically query or poll the identity server to determine if a new identity is available. Alternatively, a device user could initiate a search for a new identity via the application. That is, there are at least three scenarios under which an identity might be retrieved. The first scenario is an initial activation where an original identity is retrieved. The second scenario is an automated trigger to perform an identity retrieval, such as polling, a timed query, or a push of a notification message. The third scenario is a manual or user-initiated query. In the latter two scenarios, a replacement identity is retrieved.

In an embodiment, when retrieving an identity, the identity retrieval application is restricted to accessing only certain portions of a secure network. That is, a secure, over-the-air communication link between the application and the identity server may allow access only to the identity server and no other secure areas. More specifically, the only information that the application may be allowed to retrieve over the secure communication link may be a device identifier and an authentication key for a memory module on the device on which the application is installed.

The secure communication link may use Bearer Independent Protocol (BIP) for over-the-air communication of identity information to the memory module. For open internet connections, the secure communication link might be, for example, a Secure Sockets Layer (SSL) connection, a Transport Layer Security (TLS) tunnel, or a virtual private network (VPN). Alternatively, a "walled garden" might be used to create a private secure communication link. That is, communication might be allowed only with a portion of a network that has stricter security controls than the rest of the network. Once the secure communication link exists, the critical parameters may be updated securely over the air.

Certain portions of the memory module can currently be updated over the air, but not the device identifier or the authentication key, such as the K value or the IMSI. The secure mechanism disclosed herein for communicating with the identity server unblocks the over-the-air updateability of those parameters. That is, in an embodiment, the over-the-air interface is provided with sufficient security to allow some updates that are currently allowed only over a hard-wired connection to be performed over the air.

In an embodiment, multiple identities for a single device may be concurrently stored on the identity server, possibly more than can be stored on the device concurrently. The device may thus have available to it a plurality of potential identities, any of which may be provided as needed to the device as an original identity or a replacement identity. In this way, a device with only one or two memory modules may be able to assume more than two identities at different times by performing an over-the-air retrieval of one of the plurality of potential identities that had previously been loaded onto the identity server. There would be no need to load new identity information onto the identity server at or near the time the device attempts to retrieve an identity and then to transfer the new identity information from the identity server to a memory module.

FIG. 1 illustrates an embodiment of a system that may be used in providing and receiving identity information. A mobile communication device 110, which is hereinafter referred to as the device 110, may be a mobile phone, a personal digital assistant (PDA), a media player, or another mobile communication device. The device 110 may be a laptop computer, a notebook computer, a tablet computer, or another portable computer. The device 110 may be a desktop computer or a computer-like module embedded in a machine or other system such as a printer, a refrigerator, or other device. The device 110 includes one or more memory modules 112 that may be embedded or removable cards such as SIMs, UICCs, USIMs, or R-UIMs. An identity server 120 contains a plurality of instances of identity information 122. While the identity server 120 is referred to as a server, it should be understood that this component may be some other type of entity that is capable of functioning in the manner described herein. Also, it should be understood that, while the identity server 120 is depicted interacting with only one device 110, the identity server 120 could interact with any number of devices 110.

The number of instances of identity information 122 on the identity server 120 may be greater than the number of memory modules 112 on the device 110, and therefore the number of potential identities that are available to the device 110 may be greater than the number of memory modules 112.

When an identity 122 is to be provided to the device 110, either as an original identity or a replacement identity, a secure over-the-air communication link 130 may be established between the device 110 and the identity server 120. The over-the-air communication link 130 may be based on CDMA, GSM, LTE, WiMAX, or some other wireless communication protocol. In an embodiment, the device 110 comprises a cellular radio transceiver 115 that may be used to establish wireless communication links, for example to establish the secure over-the-air communication link 130. The cellular radio transceiver 115 may communicate based on CDMA, GSM, LTE, WiMAX, or some other wireless communication protocol. While a single radio transceiver is illustrated in FIG. 1, it is understood that the device 110 may comprise a plurality of radio transceivers, such as two or more cellular radio transceivers and possibly medium range to short range radio transceivers such as one or more WiFi radio transceiver, one or more Bluetooth® transceiver, one or more near field communication (NFC) radio transceiver, and the like. The level of security on the communication link 130 is sufficient that information that previously was transmitted only over a wired connection may be transmitted over an over-the-air communication link. Alternatively, the identity 122 may be encrypted and transmitted over a communication link with a lower level of security than the communication link 130. It should be understood that the communication link 130 is not necessarily a direct connection between the device 110 and the identity server 120 and may include intermediary components not shown.

An application 114 on the device 110 can mediate the retrieval of identity information 122 from the identity server 120. Upon initial activation of the device 110, the application 114 may promote the establishment of the secure communication link 130. The application 114 may then promote the retrieval of one or more of the instances of identity information 122 from the identity server 120 and the installation of one or more of the instances of identity information 122 in one or more of the memory modules 112. At a later time, the application 114 may re-establish the secure communication link 130 and retrieve another instance of identity information 122 to replace the identity information that was previously loaded into one of the memory modules 112.

Figure 2:
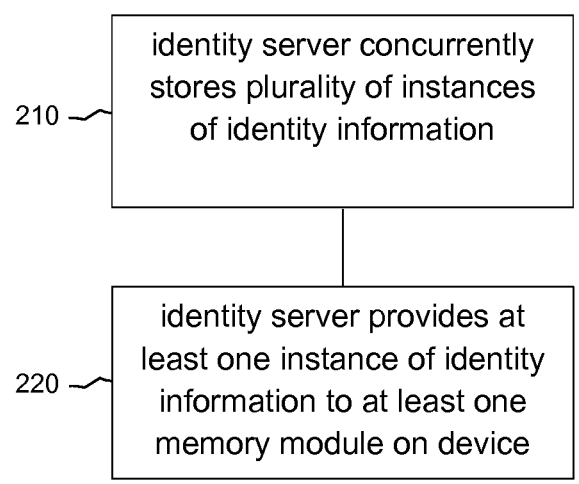
FIG. 2 is a flow chart of a method for providing identity information according to an embodiment of the disclosure.

FIG. 2 is a flow chart illustrating an embodiment of a method for providing identity information for a telecommunications device. At block 210, an identity server concurrently stores a plurality of instances of the identity information. At block 220, the identity server provides at least one of the instances of the identity information to at least one memory module on the device. The number of concurrently stored instances of the identity information may be greater than the number of memory modules.

Figure 3:
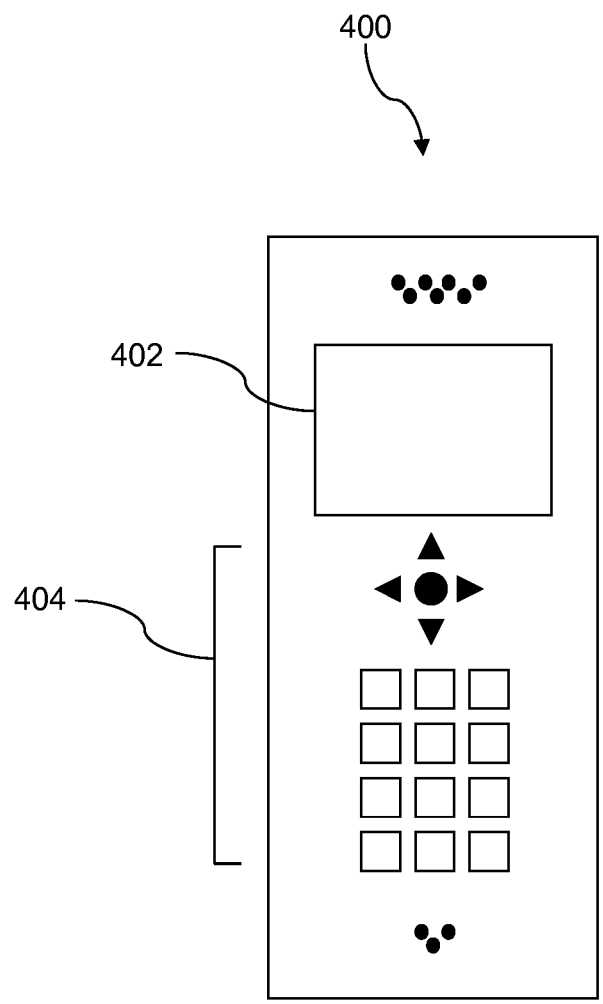
FIG. 3 is an illustration of a handset according to an embodiment of the disclosure.

FIG. 3 depicts a mobile device 400, which is operable for implementing aspects of the present disclosure, but the present disclosure should not be limited to these implementations. The mobile device 400 may be substantially similar to the device 110 of FIG. 1. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
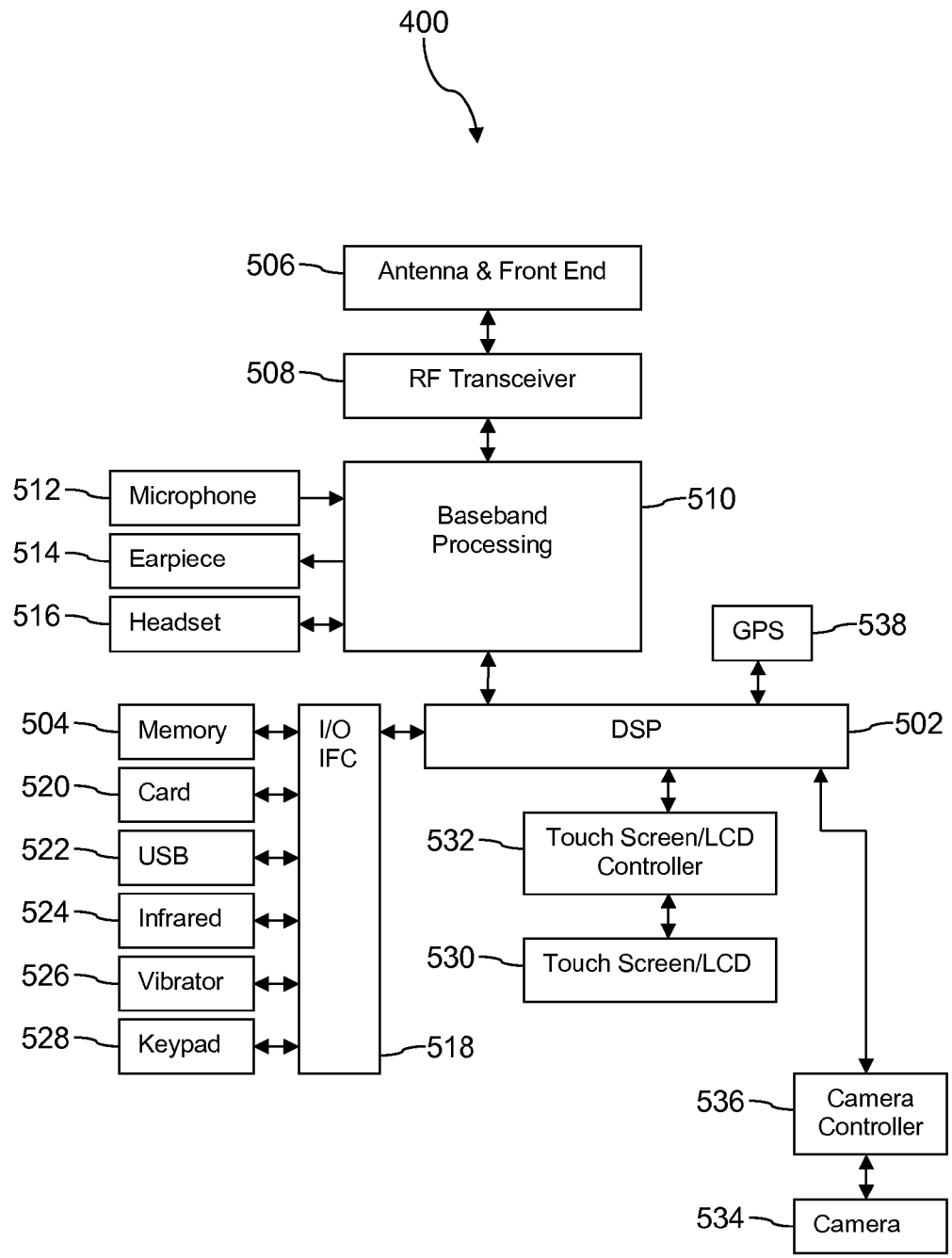
FIG. 4 is a block diagram of a handset according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
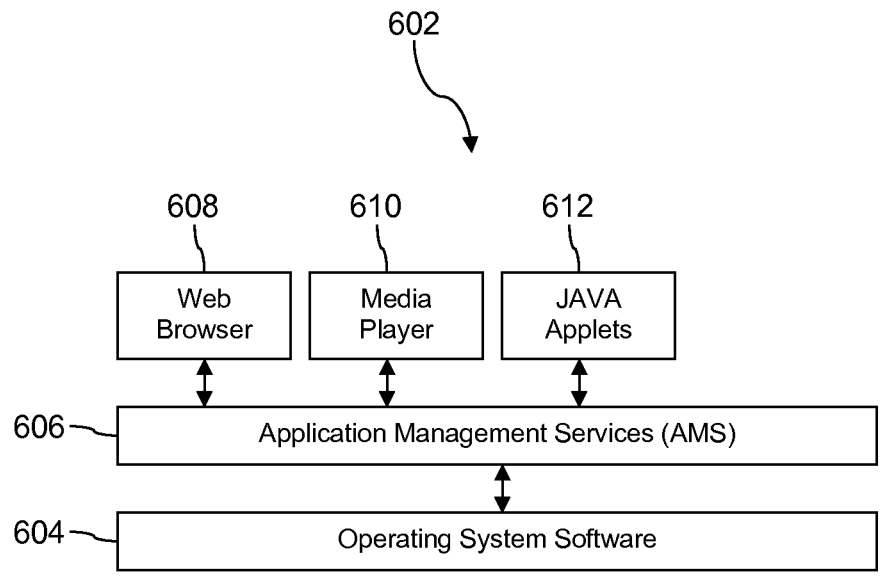
FIG. 5A is a block diagram of a software architecture of a handset according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
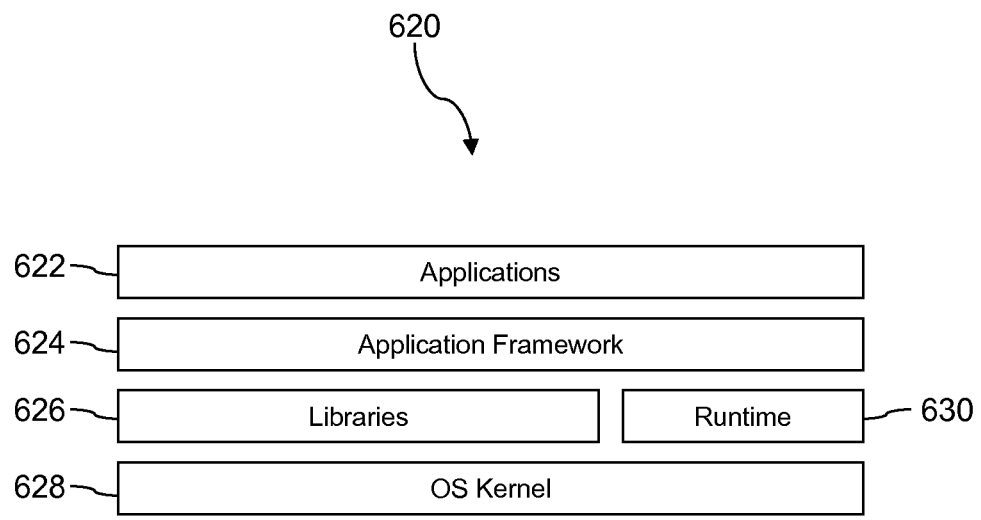
FIG. 5B is a block diagram of another software architecture of a handset according to an embodiment of the disclosure.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
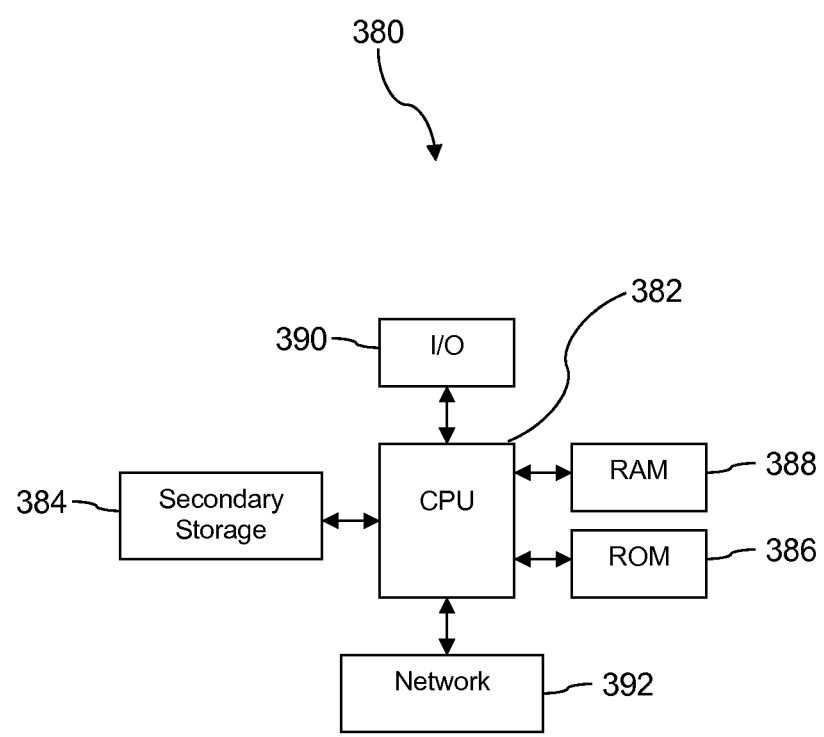
FIG. 6 is an illustration of an exemplary computer system suitable for implementing some aspects of the several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for receiving identity information for a mobile communication device, the method comprising:
 a memory module on the mobile communication device receiving, over a wireless communication link, a device identifier and an authentication key, wherein no identity information had previously been provided to the memory module, wherein the memory module is one of a subscriber identity module (SIM), a universal integrated circuit card (UICC), a universal subscriber identity module (USIM), or a removable identity module (R-UIM).

2. The method of claim 1, wherein the memory module receives the device identifier and the authentication key at the time of activation or at the time of fulfillment of the device.

3. The method of claim 1, wherein the mobile communication device includes an application configured to establish the wireless communication link to an identity server and further configured to retrieve the device identifier and the authentication key from the identity server over the wireless communication link.

4. The method of claim 3, wherein the application determines the identity server from which to retrieve the device identifier and the authentication key by communicating with a routing component that directs the application to the identity server appropriate for the memory module.

5. The method of claim 3, wherein the application determines the identity server from which to retrieve the device identifier and the authentication key by referring to a pre-existing association between the identity server and the memory module.

6. The method of claim 3, wherein the number of instances of identity information that the identity server is capable of concurrently retaining for the mobile communication device is greater than the number of memory modules on the mobile communication device.

7. The method of claim 1, wherein the device identifier and the authentication key are the only information that can be retrieved over the wireless communication link.

8. A method for providing identity information for a mobile communication device, the method comprising:
 an identity server storing concurrently a plurality of instances of the identity information; and
 the identity server providing at least one of the instances of the identity information to at least one memory module on the mobile communication device, wherein the number of concurrently stored instances of the identity information is greater than the number of memory modules, wherein the at least one memory module is one of a subscriber identity module (SIM), a universal integrated circuit card (UICC), a universal subscriber identity module (USIM), or a removable identity module (R-UIM).

9. The method of claim 8, wherein the identity information is provided over a secure wireless communication link between the identity server and the mobile communication device.

10. The method of claim 8, wherein no identity information was previously provided to at least one of the memory modules.

11. The method of claim 8, wherein the identity information replaces other identity information that had previously been provided to at least one of the memory modules.

12. The method of claim 11, wherein the replacement of the other identity information is triggered by at least one of:
   a message from the identity server to the mobile communication device informing the mobile communication device that new identity information is available;
   an automated query by the mobile communication device to determine if new identity information is available; and
   a manual query to determine if new identity information is available.

13. The method of claim 8, wherein the identity information is provided to the mobile communication device at the time of activation or at the time of fulfillment of the mobile communication device.

14. The method of claim 8, wherein the identity information is the only information that can be provided over the wireless communication link.

15. A mobile communication device comprising:
   a cellular radio transceiver;
   a processor;
   a non-transitory memory; and
   an application stored in the non-transitory memory that, when executed by the processor, is configured to use the cellular radio transceiver to establish a secure wireless communication link between the device and an identity server, is further configured to retrieve identity information from the identity server over the wireless communication link, and is further configured to install the identity information on a memory module on the device, wherein the memory module is one of a subscriber identity module (SIM), a universal integrated circuit card (UICC), a universal subscriber identity module (USIM), or a removable identity module (R-UIM).

16. The device of claim 15, wherein the mobile communication device receives the identity information at the time of activation or at the time of fulfillment of the mobile communication device.

17. The mobile communication device of claim 15, wherein the identity information is one of an international mobile subscriber identity (IMSI) or a mobile directory number (MDN).

18. The mobile communication device of claim 15, wherein the identity information replaces other identity information that had previously been provided to the memory module.

19. The mobile communication device of claim 18, wherein the replacement of the other identity information is triggered by at least one of:
   a message from the identity server to the mobile communication device informing the mobile communication device that new identity information is available;
   an automated query by the mobile communication device to determine if new identity information is available; and
   a manual query to determine if new identity information is available.

20. The mobile communication device of claim 15, wherein the number of instances of identity information that the identity server is capable of concurrently retaining for the mobile communication device is greater than the number of memory modules on the mobile communication device.

* * * * *